United States Patent
Chen

[19]

[11] Patent Number: 6,149,809
[45] Date of Patent: Nov. 21, 2000

[54] WATER TREATMENT SYSTEM WITH BACKWASHABLE PRECISE PREFILTER UNIT

[76] Inventor: Kai Rui Chen, No. 27, Bldg. 5, Nan Qi Xiang, Gong Qing Tuan Xi Ru, Zhang Dian District, Zi Bo, Shan Dong Province 255000, China

[21] Appl. No.: 09/379,637

[22] Filed: Aug. 24, 1999

Related U.S. Application Data

[63] Continuation of application No. 08/871,970, Jun. 10, 1997, Pat. No. 5,958,232.

[30] Foreign Application Priority Data

Dec. 27, 1996 [CN] China ................... 96 2 23167

[51] Int. Cl.⁷ ................... B01D 25/02
[52] U.S. Cl. ............ 210/257.2; 210/660; 210/663; 210/282; 210/87; 210/670; 210/333.01
[58] Field of Search .............. 210/257.2, 660, 210/663, 282, 87, 670, 333.01, 791, 792, 793, 195.1, 108, 135

[56] References Cited

U.S. PATENT DOCUMENTS

| | | | |
|---|---|---|---|
| 4,317,721 | 3/1982 | Pinnönen ................... | 210/136 |
| 4,342,651 | 8/1982 | Ahrens ................... | 210/636 |
| 4,352,739 | 10/1982 | Oliver, Jr. et al. ................... | 210/739 |
| 5,094,742 | 3/1992 | Miller et al. . | |
| 5,281,338 | 1/1994 | Harris . | |
| 5,358,635 | 10/1994 | Frank et al. . | |
| 5,510,027 | 4/1996 | Tejada ................... | 210/282 |
| 5,632,892 | 5/1997 | Klein ................... | 210/257.2 |
| 5,772,867 | 6/1998 | Chiang et al. ................... | 210/90 |
| 5,906,751 | 5/1999 | Parker ................... | 210/741 |
| 5,958,232 | 9/1999 | Chen ................... | 210/257.2 |

FOREIGN PATENT DOCUMENTS 2-83082  3/1990  Japan .

OTHER PUBLICATIONS

*Handbook of Industrial Membranes*, First Edition, Figure 4., p. 529.

*Primary Examiner*—Ana Fortuna
*Attorney, Agent, or Firm*—Smith Gambrell & Russell, LLP

[57] ABSTRACT

A water treatment system with a backwashable precise prefilter unit includes a backwashable prefilter column installation and a five-channel ball valve. The five-channel ball valve connects the water supply with both ends of the backwashable prefilter column installation. The backwashable prefilter column installation may be composed of three filter columns arranged in series: the first packed with quartz sand, the second with Cu-Zn alloy, and the third with sintered microporous polyethylene. The five-channel ball valve has three different working positions, namely, a cleaning water position, a discharging water position, and a backwashing position. The useful life of this backwashable precise prefilter unit can be more than three years. This backwashable precise prefilter unit may be used for independent water cleaners, as well as the precise prefilter for different kinds of water treatment systems, such as reverse osmosis water treatment systems.

7 Claims, 5 Drawing Sheets

WATER TREATMENT SYSTEM WITH BACKWASHABLE PRECISE PREFILTER UNIT

RELATED APPLICATION DATA

This application claims priority benefits under 35 U.S.C. §120 based on U.S. patent application Ser. No. 08/871,970, filed Jun. 10, 1997 (now U.S. Pat. No. 5,958,232) which application is entirely incorporated herein by reference.

BACKGROUND OF THE INVENTION

1. Field of the Invention

This invention relates to a water treatment system, more particularly, it relates to a water treatment system with a backwashable precise prefilter unit. This water treatment system with a backwashable precise prefilter unit includes a backwashable prefilter column installation and a five-channel ball valve.

2. Background Information

Different types of water treatment apparatuses and systems are known in daily life and industry. Typical water treatment systems include several filtration steps in series, using either medium types or small types of filters. Usually, these prefilters are composed of precise filters with 1–2 grade cotton or polymer fibers and filters with 1–2 grade active carbon. Due to the fact that such filters have no backwashable ability, these water treatment systems with traditional designs must be carefully used to maintain their effectiveness. In tap water, sand, rust, and colloid particles etc. are present; all such dirty particles can accumulate on the precise filter core, and finally its water penetration ability gradually decreases, and eventually, these filters will be destroyed. Secondly, the active carbon can be consumed quickly due to the high content of chlorine in water. The surface adsorption can be gradually saturated, and bacteria in the active carbon can easily grow. In this manner, if the prefilter core can not be replaced frequently, the ordinary working process of the water treatment system will be directly destroyed, and the useful life thereof greatly shortened. Usually, every half a year, the core of the prefilter should be replaced. If the tap water has high turbidity, or if high amounts of chlorine exist, the filter core replacement period should be shortened. This means that the customers must pay more for maintenance and also will have more trouble during use.

SUMMARY OF THE INVENTION

The object of this invention is to provide a water treatment system with a backwashable precise prefilter unit.

A further object of this invention is to provide a water treatment system with a backwashable precise prefilter unit, the system including a backwashable prefilter column installation and a five-channel ball valve.

A further object of this invention is to provide a water treatment system with a backwashable precise prefilter unit, wherein the five-channel ball valve can be put in three different working positions, specifically, a cleaning water position, a discharging water position, and a backwashing position.

A further object of this invention is to provide a water treatment system with a backwashable precise prefilter unit, wherein the backwashable prefilter column installation has a long useful life and high efficiency, and it is made with filtering materials that have the ability to recover to their original state after the backwashing process.

A further object of this invention is to provide a water treatment system with a backwashable precise prefilter unit for domestic and group applications. Using the system of the invention, the prefilter unit need not be replaced frequently. In this manner, the problem that the customers need to frequently replace the filter core can be eliminated, the useful life of the system can be lengthened, and the quality of the water can be ensured. Furthermore, the system of the invention may be used for independent water cleaners, as well as the precise prefilter for different kinds of water treatment systems.

In order to realize the objects mentioned above, this invention includes the following features: a water treatment system with a backwashable precise prefilter unit that includes a backwashable prefilter column installation and a five-channel ball valve. The ball valve can be controlled by a handle, such that the water treatment system can have three working positions: a cleaning water position, a discharging water position, and a backwashing position, with three water flow channels arranged in the different directions, respectively. The backwashable prefilter column installation is composed of at least one filter column, and preferably three or more filter columns in series, each column containing different filtering materials (e.g., long lasting and recoverable filter materials). For example, in a three filter column series, the first filter column may be packed with 0.5 mm quartz sand, the second filter column may be packed with high purity granular copper-zinc alloy, and the third filter column may be packed with sintered microporous polyethylene (PE) with 3 $\mu$m filtration ability.

The five-channel ball valve includes an original water inlet, an original water outlet, a filtered water inlet, a filtered water outlet, and a discharging channel, wherein the five-channel ball valve is switchable between the following working positions: a cleaning water position, a discharging water position, and a backwashing position.

In a preferred embodiment, an inlet of a first column of the backwashable prefilter column installation is connected with an original water outlet of the five-channel ball valve, and an outlet of a final filter column of the backwashable prefilter column installation is connected with a filtered water inlet of the five-channel ball valve. An original water inlet of the five-channel ball valve includes a conventional connector element for connecting it with the outlet of the water supply, such that by controlling the five-channel ball valve in the three working positions, water passes through the backwashable precise prefilter unit along three water flow channels arranged in the different directions. When at the cleaning position, the incoming water passes through the backwashable prefilter column installation in a positive or forward direction and then through the filtered outlet of the five-channel ball valve and out of the system. When at the backwashing position, the incoming water passes through the backwashable prefilter column installation in a negative or backward direction and then through the discharging channel of the five-channel ball valve to be drained. Finally, when at the discharging position, the incoming water in the positive direction passes through the backwashable prefilter column installation in the positive or forward direction and then through the discharging channel of the five-channel ball valve to be drained.

This invention has obvious benefits in comparison with techniques currently used: depending on the water flow amount of the water treatment system and the quality of the tap water, customers can backwash the precise prefilter unit two times every week and 5–10 minutes every time, and then discharge the filter unit (1–2 minutes every time). In this manner, all the dirty materials accumulated on the filters can be discharged through the discharging channel, and then all the filter materials are returned to their original quality state. Therefore, it can be ensured that the water quality entering the water treatment system is stable, and also that the final treated water, flowing out of the drinking water treatment system, is stable.

The backwashable prefilter column installation can work more than three years, and the whole system can have its useful life lengthened. This not only decreases the cost for maintenance, but it also eliminates the trouble of frequent replacement of filter materials, while ensuring the water quality.

DETAILED DESCRIPTION OF THE INVENTION

Figure 1:
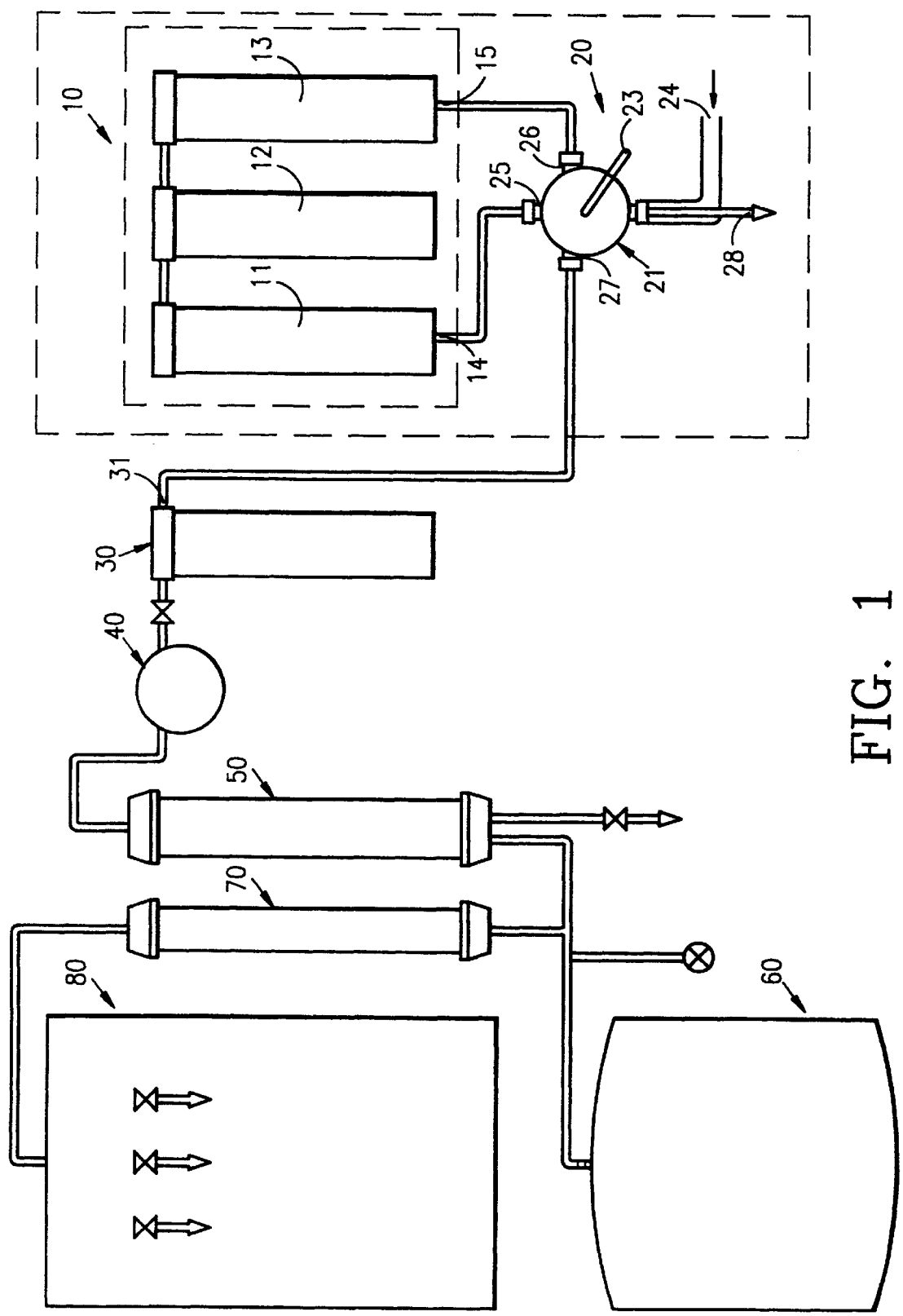
FIG. 1 illustrates the structure of the backwashable prefilter unit according to this invention in a reverse osmosis water treatment system.
Figure 3:
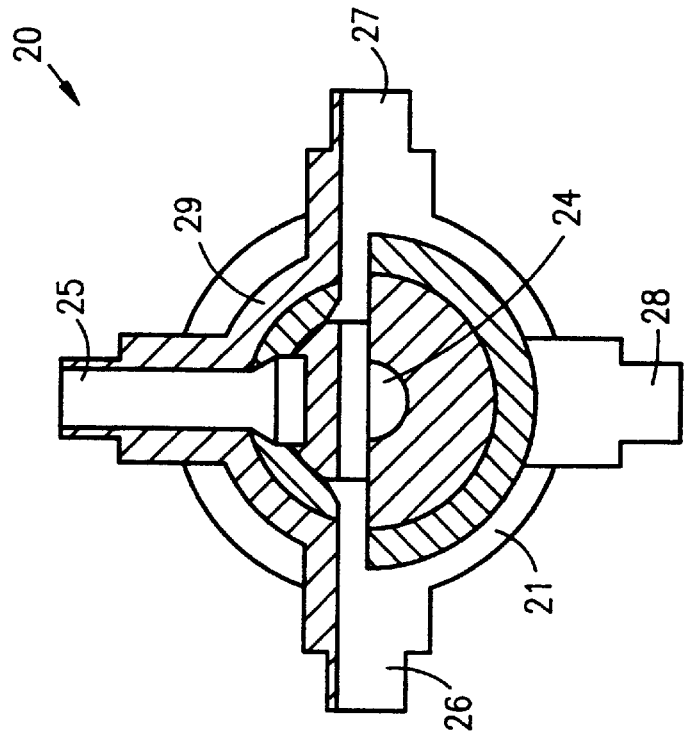
FIG. 3 is the section structure of a ball valve used in this invention.
Figure 2:
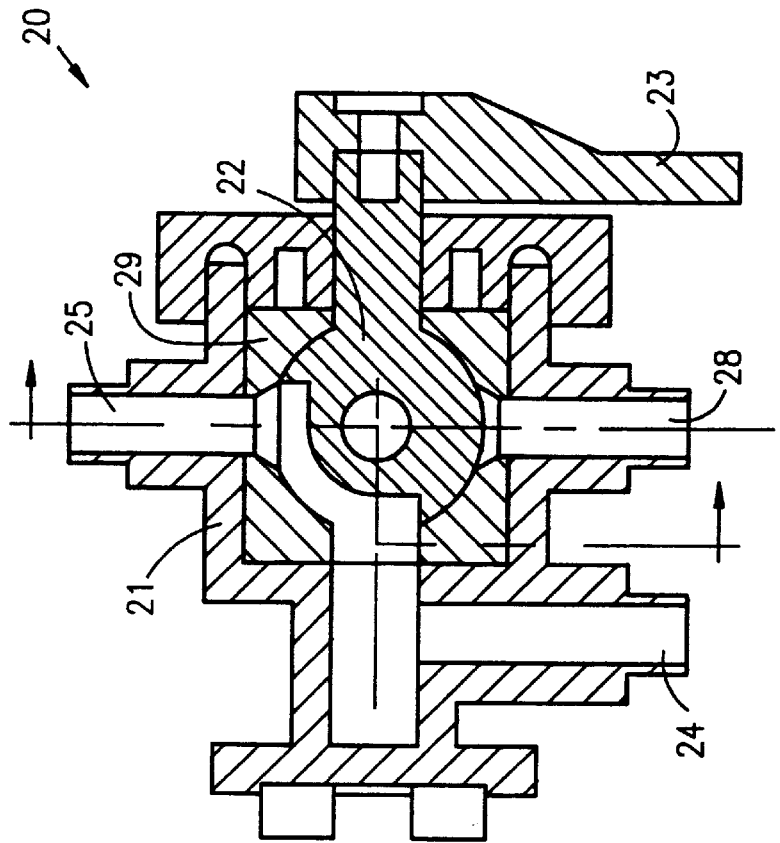
FIG. 2 is the rotational section structure of a ball valve used in this invention.

Referring to FIG. 1 to FIG. 6, this reverse osmosis drinking water treatment system with a backwashable precise prefilter unit is composed of a super precise filter 30, a pressure pump 40 and its automatic control system, a reverse osmosis membrane 50 (or nano-filtration membrane), a pressure tank 60, a post filter 70, a drinking water dispensing apparatus 80, a backwashable prefilter column installation 10, and a five-channel ball valve 20. The five-channel ball valve 20 is composed of valve body 21, a circular ball valve 22 in the valve body 21, and handle 23. The handle 23 is connected to the circular ball valve 22. In the valve body 21, there are original water inlet 24, original water outlet 25, filtered water inlet 26, filtered water outlet 27, and discharging channel 28. On the circular valve 22, there are original water channel 221 and water flow channel 222. In order to seal the space between the circular ball valve 22 and the valve body 21, it is necessary to put water sealing disk 29 on the outside surface of the circular ball valve 22.

Figure 4:
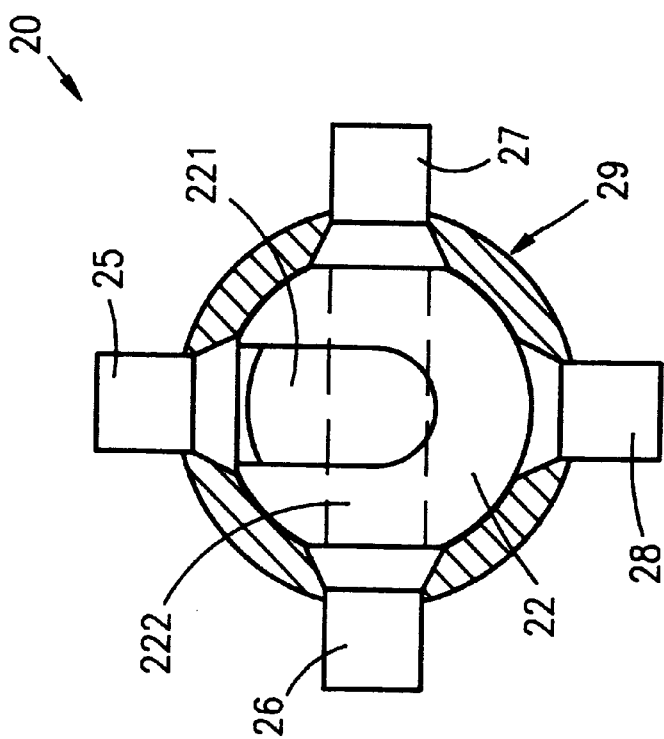
FIG. 4 is the structure of the ball valve at the cleaning water position.

The handle 23 can be used to place the circular ball valve 22 in three positions, namely, a cleaning water position, a discharging water position, and a backwashing position. As shown in FIG. 4, the circular ball valve 22 is in the cleaning water position. Here, the tap water passes through original water inlet 24→original water outlet 25→backwashable prefilter column installation 10 (in the forward direction) →filtered water inlet 26→filtered water outlet 27→and super precise filter 30.

Figure 5:
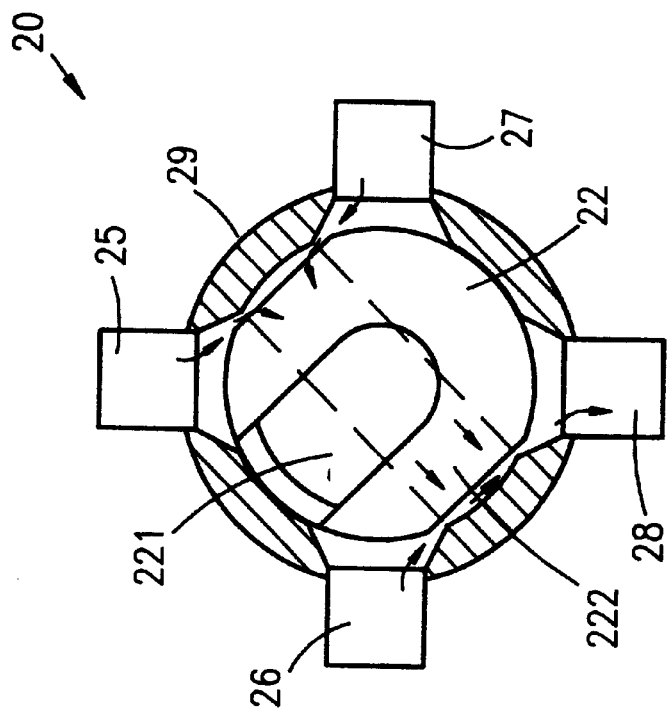
FIG. 5 is the structure of the ball valve at the discharging water position.

From the position of FIG. 4, by rotating the handle 23, as shown in FIG. 5, the circular ball valve 22 is put in the discharging water position. In this position, original water outlet 25, filtered water inlet 26, and filtered water outlet 27 are connected with discharging channel 28, and dirty water can be discharged out of the inner body of the valve 20. Water passes through the backwashable prefilter column installation in the forward direction.

Figure 6:
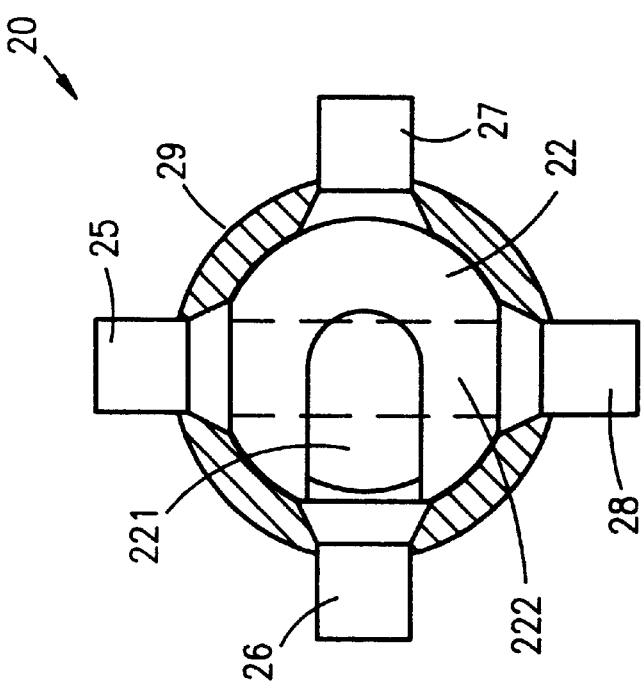
FIG. 6 is the structure of the ball valve at the backwashing position.

From the position of FIG. 4, by rotating the handle 90°, as shown in FIG. 6, the circular ball valve 22 is put in the backwashing position, and in this position, tap water passes through original water inlet 24→filtered water inlet 26→backwashable prefilter filter column installation 10 (in the backward direction)→original water outlet 25→and discharging channel 28. In this manner, backwashing can be realized by the backwashable prefilter columns.

Figure 7:
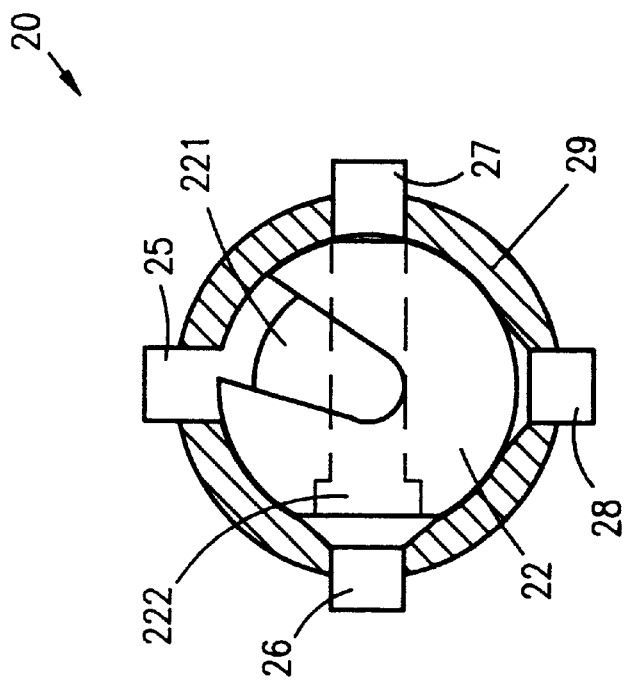
FIG. 7 is another structure of a ball valve at the cleaning water position.
Figure 8:
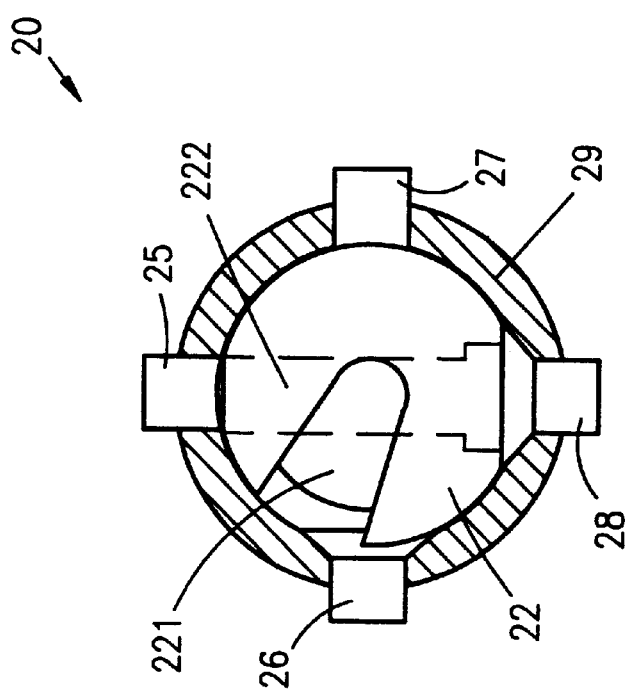
FIG. 8 is another structure of a ball valve at the discharging water position.
Figure 9:
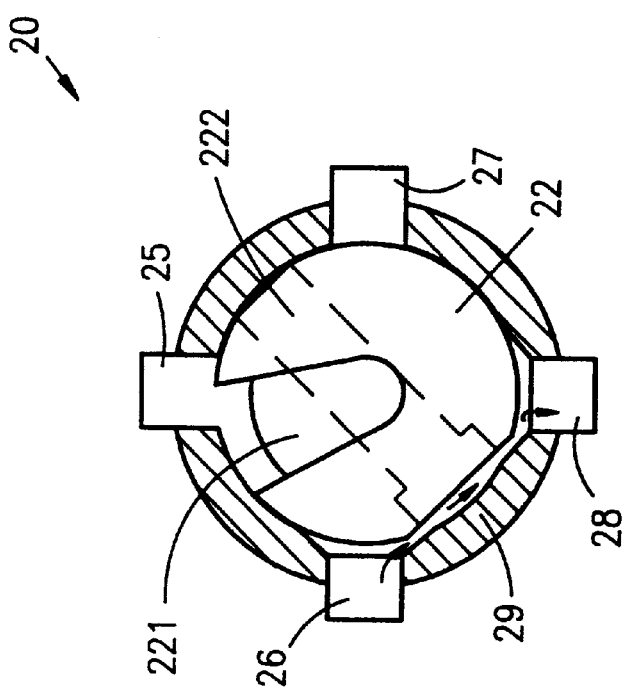
FIG. 9 is another structure of a ball valve at the backwashing position.

When the tap water is very dirty, in order to avoid the situation where dirty material from the inlet water may oppositely suck the prefilter column after concentration during the backwashing process, this invention includes a five-channel ball valve 20 with another structure, as shown in FIG. 7 to FIG. 9. In FIG. 7, the five-channel ball valve 20 is situated in the cleaning water position, while in FIG. 9, it is situated in the backwashing position. The water flow directions of these two positions are the same as the directions shown in FIG. 4 and FIG. 6, respectively. Additionally, as shown in FIG. 8, the circular ball valve 22 of this embodiment is in the discharging water position. At this position, tap water passes through original water inlet 24→original water outlet 25→backwashable prefilter column installation 10→filtered water inlet 26→discharging channel 28, and then out of the system. In this manner, all the dirty material, concentrated after backwashing and remaining in the filter column, can be entirely discharged out.

The backwashable prefilter column installation 10 is connected to the front stage of the super precise filter 30 through the five-channel ball valve 20. The backwashable prefilter column installation 10 is composed of filter column 11, filter column 12, and filter column 13, connected in series. The water inlet 14 of filter column 11 is connected with the original water outlet 25 of the five-channel ball valve 20; the outlet 15 of filter column 13 is connected with filtered water inlet 26 of the five-channel ball valve 20; and the filtered water outlet 27 of five-channel ball valve 20 is connected with the water inlet 31 of the super precise filter 30. In filter column 11, quartz sand is packed having a particle size of 0.5 mm; in filter column 12, high purity granular copper-zinc alloy is packed; and in filter column 13, sintered microporous PE is packed with a filtration ability of 3 μm.

As is known, quartz sand is the filtration medium with the longest life. It can filter out the mud, sand, iron rust, colloid particles, and other large particles (10–100 μm.). By means of backwashable, it is easy to discharge these dirty particles out in the opposite direction.

By means of oxidation and reduction processes, granular pure Cu-Zn alloy can be used to eliminate excessive chlorine and heavy metal ions in the inlet water. Additionally, this alloy has the ability to eliminate bacteria and alga, and also to reduce the hardness of the water. During backwashing, iron oxides and copper sulfide deposited on the alloy surface can be discharged out. In this manner, the water purification ability can be recovered to its initial level, and the useful life can be over 10 years.

Sintered microporous PE is a precise filtration medium with a rigid, honeycomb, tertiary structure. It can be used to filter out fine dirty materials, and the output water has an SDI less than 5. The sintered microporous PE material has excellent chemical properties, is odorless and nontoxic, and its filtration ability can be recovered instantaneously after backwashing. Its useful life can be over 5 years.

Furthermore, in order to let the customers have more convenience, during the design of this apparatus, the backwashable precise prefilter unit can be separated from the traditional mono-structure drinking water treatment system. It can be designed as a single, nice, small, and thin type of structure, which is able to be placed on the wall over the tap. In this form, it can be placed near the tap water outlet, and therefore, the user can easily accomplish the backwashing function by rotating the handle 1–2 times a week. Due to the fact that the prefilter unit is separate from the drinking water treatment system, small and thin types can be easily obtained, and this apparatus can be put under the sink.

As is evident from the above description, as used in this application, water moving through the backwashable prefilter column installation in a "forward" or "positive" direction means that the water flows through the backwashable prefilter column installation in the direction conventionally intended for cleaning the water (e.g., through the coarse filter column first, then through the intermediate filter column, and then through the fine filter column). Similarly, water moving through the backwashable prefilter column installation in a "backward" or "negative" direction means that the water flows through the backwashable prefilter column installation in a direction opposite to the positive or forward direction identified above (e.g., through the fine filter column first, then through the intermediate filter column, and then through the coarse filter column).

Those skilled in the art will appreciate that various changes and modifications can be made without departing from the spirit and scope of the invention, as defined in the appended claims.

What is claimed is:

1. A water treatment system comprising:
   a backwashable prefilter column installation; and
   a five-channel ball valve having an original water inlet, an original water outlet, a filtered water inlet, a filtered water outlet, and a discharging channel, wherein the five-channel ball valve is switchable between the following working positions: a cleaning water position, a discharging water position, and a backwashing position,
   wherein an inlet of the backwashable prefilter column installation is connected with the original water outlet of the five-channel ball valve,
   wherein an outlet of the backwashable prefilter column installation is connected with the filtered water inlet of the five-channel ball valve,
   wherein the original water inlet of the five-channel ball valve includes a connector element for connecting with an outlet of a water supply, and
   wherein, by switching the five-channel ball valve to the different working positions, water passes through the water treatment system in three different manners as follows:

when at the cleaning water position, incoming water passes through the inlet of the backwashable prefilter column installation, then through the backwashable prefilter column installation in a forward direction, then through the outlet of the backwashable prefilter column installation, and then through the filtered water outlet of the five-channel ball valve;

when at the backwashing position, incoming water passes through the outlet of the backwashable prefilter column installation, then through the backwashable prefilter column installation in a backward direction, then through the inlet of the backwashable prefilter column installation and then through the discharging channel of the five-channel ball valve; and when at the discharging position, the incoming water passes through the inlet of the backwashable prefilter column installation, then through the backwashable prefilter column installation in the forward direction, then through the outlet of the backwashable prefilter column installation, and then through the discharging channel of the five-channel ball valve.

2. The water treatment system of claim 1, wherein the five-channel ball valve includes a valve body, a circular ball valve, and a handle,
   the circular ball valve being in the valve body and connected with the handle, wherein the five-channel ball valve can be placed in the different working positions by rotating the handle,
   the valve body having an original water inlet, an original water outlet, a filtered water, inlet, a filtered water outlet, and a discharging channel, and
   the circular ball valve having an original water channel and a water flow channel.

3. The water treatment system of claim 1, wherein the backwashable prefilter column installation includes three filter columns arranged in series.

4. The water treatment system of claim 3, wherein the three filter columns are packed with three different filter materials.

5. The water treatment system of claim 4, wherein:
   a first column of the prefilter column installation is packed with quartz sand,
   a second column of the prefilter column installation is packed with granular Cu-Zn alloy, and
   a third column of the prefilter column installation is packed with sintered microporous polyethylene.

6. The water treatment system of claim 5, wherein the sintered microporous polyethylene has a 3 $\mu$m filtration ability.

7. The water treatment system of claim 3, wherein the three filter columns of the backwashable prefilter column installation respectively include, as filter materials, quartz sand, granular Cu-Zn alloy, and sintered microporous polyethylene.

* * * * *